(12) United States Patent
Stephens et al.

(10) Patent No.: US 6,347,079 B1
(45) Date of Patent: *Feb. 12, 2002

(54) APPARATUS AND METHODS FOR PATH IDENTIFICATION IN A COMMUNICATION NETWORK

(75) Inventors: Allan J. Stephens, Ottawa; Raymond Chi-Sing Ma, Nepean, both of (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,107

(22) Filed: May 8, 1998

(51) Int. Cl.[7] .............................. H04L 12/28; H04J 3/26; G06K 9/62
(52) U.S. Cl. ........................ 370/255; 370/390; 370/432; 709/242; 382/157
(58) Field of Search ................................ 370/235, 385, 370/254–258, 432, 248, 390; 714/57; 707/4; 382/155, 157; 709/239, 242

(56) References Cited

U.S. PATENT DOCUMENTS

| | | | | | |
|---|---|---|---|---|---|
| 5,202,985 A | * | 4/1993 | Goyal | ............................. | 707/4 |
| 5,459,725 A | * | 10/1995 | Bodner et al. | .............. | 370/390 |
| 5,668,800 A | * | 9/1997 | Stevenson | .................... | 370/248 |
| 5,905,724 A | * | 5/1999 | Carson et al. | .............. | 370/385 |
| 5,930,254 A | * | 7/1999 | Liron et al. | .................. | 370/395 |
| 5,987,521 A | * | 11/1999 | Arrowood et al. | .......... | 709/239 |
| 6,122,759 A | * | 9/2000 | Ayanoglu et al. | ............. | 714/57 |

\* cited by examiner

Primary Examiner—Hassan Kizou
Assistant Examiner—John Pezzlo
(74) Attorney, Agent, or Firm—Cobrin & Gittes

(57) ABSTRACT

An apparatus and methods for path identification in a communication network, including a plurality of network elements, the plurality of network elements further including a first network element, for issuing a first signal requesting a path identification operation, and at least one second network element, for receiving the first signal and for issuing a second signal. The second signal contains information of one of network configuration, network topology and distance between the first network element and the at least one second network element.

53 Claims, 12 Drawing Sheets

FIG. 4

| Command | Source Id | Correl. Tag | Responder Id | Distance |
|---|---|---|---|---|

Command
1 = Trace Request
2 = Trace Repeat
3 = Trace Report
4 = Trace Response

Trace Request Data Streams

Trace Repeat Data Streams

Trace Report Data Streams

Trace Response Data Streams

Response List
(Backward)
A:1

Response List
(Forward)
C:1
D:2
E:3

APPARATUS AND METHODS FOR PATH IDENTIFICATION IN A COMMUNICATION NETWORK

FIELD OF THE INVENTION

The present invention is directed to apparatus and methods for path identification in a communication network and, in particular, to apparatus and methods for identifying the route followed between a source unit and a destination unit through a data communication network.

BACKGROUND OF THE INVENTION

A communication network includes multiple network elements which are connected together into a single entity by a set of links. Each link joins together two distinct network elements. The network allows end-user data to be transmitted to a network element. The data is then transferred across the network, through a subset of the links and network elements, and is regenerated at another network element.

The network provides one or more levels of service for the end-user data which is carried over same. These levels of service may be dictated by the needs of the end-user. The level of service may also control the amount of data which can be transferred by the end-user, the speed at which the data passes through the network, and the probability that the data will be discarded by the network during transfer.

In creating and maintaining a communication network, it is necessary for the network operator to be able to ensure that end-user data is being communicated across the network in the intended manner. This requires that the network operator be able to accurately identify how the network elements are connected to one another as well as to ascertain the identity of the path which the end-user data follows as it passes through the network. Without this capability, the network operator cannot be certain that end-user data is being received by, and only by, the intended recipient(s) of that data. Further, there should be assurance that the data is being transferred at the desired service quality which is requested by the end-user.

One approach to solving this problem is to query the network's configuration management system so as to identify the path which the end-user data has been instructed to follow through the network. The information in the configuration management system, however, may not necessarily reflect what is actually happening within the network. As a result, it is entirely possible that end-user data may flow in a different manner than that intended by the configuration management system.

Problems of the above nature may arise as the result of hardware problems which may arise within the network, software problems which may arise within the network, or those problems which may arise through human error. In this regard, apparatus and methods are needed, for determining network configuration as well as path identification in a communication network, which overcome the shortfalls associated with existing systems.

SUMMARY OF THE INVENTION

The present invention provides apparatus and methods for identifying the path of connections through, and the topology of, a communication network or a data network. The present invention accomplishes path identification by injecting management data traffic into the connection at any network element or node along the path. The present invention may be utilized in asynchronous transfer mode (ATM) systems, packet switched networks and other communication networks.

The apparatus includes a source unit, a plurality of network elements or nodes, a network management element and a destination unit. The network elements or nodes may be linked to adjacent network elements by any one or more of wire links, wireless links, optical communication links, satellite links, analog communication links, digital communication links, personal communication services links, etc. The network elements may be linked to the components of the apparatus or network via any suitable communication medium. The network elements may be linked together in any contiguous network topology, including a complete or incomplete mesh, star, ring, line, or other type of configuration. The network elements are controlled or managed by the network management element which may control or manage any number, or group, of network elements.

In the apparatus, the source unit communicates with the destination unit via the network of network elements. The communication between the source unit and the destination unit is provided through a connection through the network elements. The data flow between the source unit and the destination unit is bi-directional so as to facilitate communication between the source unit and the destination unit and vice versa.

The direction of the data flow between the source unit and the destination unit is defined as the "forward" direction, while the direction of the data flow between the destination unit and the source unit is defined as the "backward" direction.

The network elements are also operatively connected to the network management element. The network management element provides command and control signals to the network elements so as to control and/or monitor the operation of same when, and if, desired.

The network elements may include a central processing unit (CPU) and an associated memory storage device. The CPU of the network element performs various processing routines during apparatus operation. The network element also includes a receiver, a transmitter and a data storage element. The network element also includes a data routing device.

The receiver receives data from the network along one or more links. The data router routes the data to the transmitter, or to the CPU, or both, in accordance with the intended destination, or the intended use, for the data. The transmitter may transmit data to the network along one or more links. Data may also be temporarily stored in the data storage device during operation of the network element.

The present invention injects control data into the data which is communicated over the apparatus or network. The CPU of the network element generates control data and injects this control data into the data which is being transmitted through the apparatus or network.

Each of the network elements or nodes has assigned thereto a unique node identification code. These node identification codes serve to identify the network element.

The present invention provides apparatus and methods for identifying the path through a communication network as well as the distances between the respective network elements or nodes. A node, defined as a "trace request node", transmits control data streams to all of the remaining nodes in the network which are defined as "responder nodes".

The apparatus and methods of the present invention may utilize a multi-stage, control data generation and processing routine which is performed for each linked portion of the network relative to the trace request node. The data or signals may be transmitted in directions away from the trace request node. The portions of the network, which are connected to the node, may be processed independently of one another.

In a first stage of operation, the trace request node may transmit a first control data stream into each of the portions of the network, along the connection to be traced. In a second stage of operation, a second control data stream may be added by any of the responder nodes, intermediate or otherwise. The data from both of these control data streams may then be utilized by other responder nodes in order to gather connection information and topology information, as well as intermediate data, which is related to the distances of each of the responder nodes from the trace request node.

In a third stage of processing, the trace request node may transmit a third control data stream, which contains additional management data, into the network portions, thereby triggering the return of fourth control data stream responses from the responder nodes to the trace request node. These returned fourth control data streams, which may constitute a fourth stage of processing, contain distance information which is representative of the distance of each of the respective responder nodes from the trace request node. The distance information, as well as the other obtained information, may thereafter be utilized by the trace request node for analysis and/or display purposes. In this manner, information regarding network topology, as well as distance data, may be obtained.

The control data streams, which may be generated by the respective nodes during apparatus operation, may consist of data which is unique to the processing routine. The control data stream may contain a command code which identifies the type of operation to be carried out by the network nodes, a source identification code (source ID) which identifies the trace request node, and a correlation tag which is unique to the trace request and unique to the portion of the network being interrogated. The control data stream may also contain a responder identification code (responder ID) which, once inserted by a respective responder node, identifies the responder node, and a distance count which indicates how far the responder node is located from the trace request node.

The CPUs of each of the nodes may be capable of performing all of the processing operations described herein, so that any one of the nodes may function as a trace request node or as a responder node at any given time.

The network management element may control the issuance of the trace request operations and the trace request nodes which issue same. The results of apparatus operation may also be obtained at the network management element.

The apparatus and methods of the present invention may perform processing operations in a single direction only, as well as in multiple directions.

In another embodiment of the present invention, the trace request node may perform a second trace request sequence of operations following a conclusion of a trace sequence. The results of the two sequences may then be compared in order to verify that they are the same. If the results fail to match, the trace request node may continue to perform additional trace request sequences until matching results are obtained for two successive sequences.

In yet another embodiment of the present invention, the trace data streams may be transmitted by responder nodes in the direction opposite the direction from which the trace request data stream was received. Such an embodiment may facilitate the detection of situations in which the trace report data streams provide the trace request node with incorrect or incomplete results, resulting from the corruption, or loss, of trace-related data streams within the apparatus. The operation of the trace request node may be modified so that it may account for instances in which the distance values, which are computed by the responder nodes, may be reversed.

In still another alternate embodiment of the present invention, each responder node may record the arrival time of the trace data stream and automatically return a trace response data stream upon the expiration of a pre-specified time period. In this embodiment, the apparatus may serve to prevent errors which may result from the corruption or loss of trace related data streams within the apparatus.

In another alternate embodiment, the apparatus and methods of the present invention may operate in a mode such that trace request data streams may overlap with each other while the integrity of the data and results obtained are maintained.

In yet another embodiment of the present invention, trace requests may be performed along connections which have a single source and multiple destinations and vice versa.

In still another embodiment of the present invention, the network elements or nodes may be comprised of two or more separate node elements. Each of the separate node elements may generate trace requests and perform network connection and/or topology processing, as well as distance data determination, for each of the links which link the node to the apparatus or network.

Accordingly, it is an object of the present invention to provide apparatus and methods for determining the configuration and/or topology of a communication network.

It is another object of the present invention to provide apparatus and methods for performing path identification and distance determination in a communication network.

It is yet another object of the present invention to provide a network element or node which may be utilized for determining configuration and/or topology, path identification, and/or distance data, in a communication network.

It is another object of the present invention to provide apparatus and methods for performing path identification in a communication network which may be configured in any topology.

It is yet another object of the present invention to provide apparatus and methods for network configuration and/or topology determination, path identification and/or distance determination in a communication network which utilizes network elements which perform various processing routines.

It is still another object of the present invention to provide apparatus and methods for determining the distances between network elements in a communication network.

It is still another object of the present invention to provide apparatus and methods for performing path identification, determining network configuration and/or topology, and/or determining distance between network elements, in a communication network, by utilizing network elements which may perform path trace request operations as well as path trace response operations.

It is yet another object of the present invention to provide apparatus and methods for performing path identification, determining network configuration and/or topology, and/or determining distance between network elements, in a communication network by transmitting trace request messages in both forward and backward directions relative to a requesting network element.

It is another object of the present invention to provide apparatus and methods for performing path identification, determining network configuration and/or topology, and/or determining distance between network elements, in a communication network by utilizing network elements which operate under software control.

It is still another object of the present invention to provide apparatus and methods for performing path identification, determining network configuration and/or topology, or determining distance between network elements, in a communication network which may perform any of the above operations in any one or more directions relative to a requesting network element.

It is another object of the present invention to provide apparatus and methods for performing path identification, determining network configuration and/or topology, and/or determining distance between network elements, in a communication network which may perform operational sequences until a satisfactory result is obtained.

It is yet another object of the present invention to provide apparatus and methods for performing path identification, determining network configuration and/or topology, and/or determining distance between network elements, in a communication network which utilizes network elements which may include multiple processing elements and routines.

It is yet another object of the present invention to provide apparatus and methods for performing path identification, determining network configuration and/or topology, and/or determining distance between network elements, in a communication network which utilizes network elements which may automatically respond to apparatus operation.

It is yet another object of the present invention to provide apparatus and methods for performing path identification, determining network configuration and/or topology, and/or determining distance between network elements, in a communication network which utilizes network elements which may perform multiple processing operations simultaneously.

It is yet another object of the present invention to provide apparatus and methods for performing path identification, determining network configuration and/or topology, and/or determining distance between network elements, in a communication network which utilizes network elements which may process multiple processing sequences along connections which have multiple paths.

Other objects and advantages of the present invention will be apparent to one skilled in the art upon a review of the Description of the Preferred Embodiment taken in conjunction with the Drawings which follow.

BRIEF DESCRIPTION OF THE DRAWINGS

The present invention will be more clearly understood by reference to the following description of an exemplary embodiment in conjunction with the accompanying Drawings, in which:

FIG. 4 illustrates the format of a control data stream which is generated and transmitted by the network elements during apparatus operation;

DESCRIPTION OF THE PREFERRED EMBODIMENTS

The present invention provides apparatus and methods for identifying the path of connections through, and the topology of, a communication network or a data network. The present invention accomplishes path identification by injecting management data traffic into the connection at a network element or node along the path. The present invention may be utilized in asynchronous transfer mode (ATM) systems, packet switched networks and other communication networks.

Figure 1:
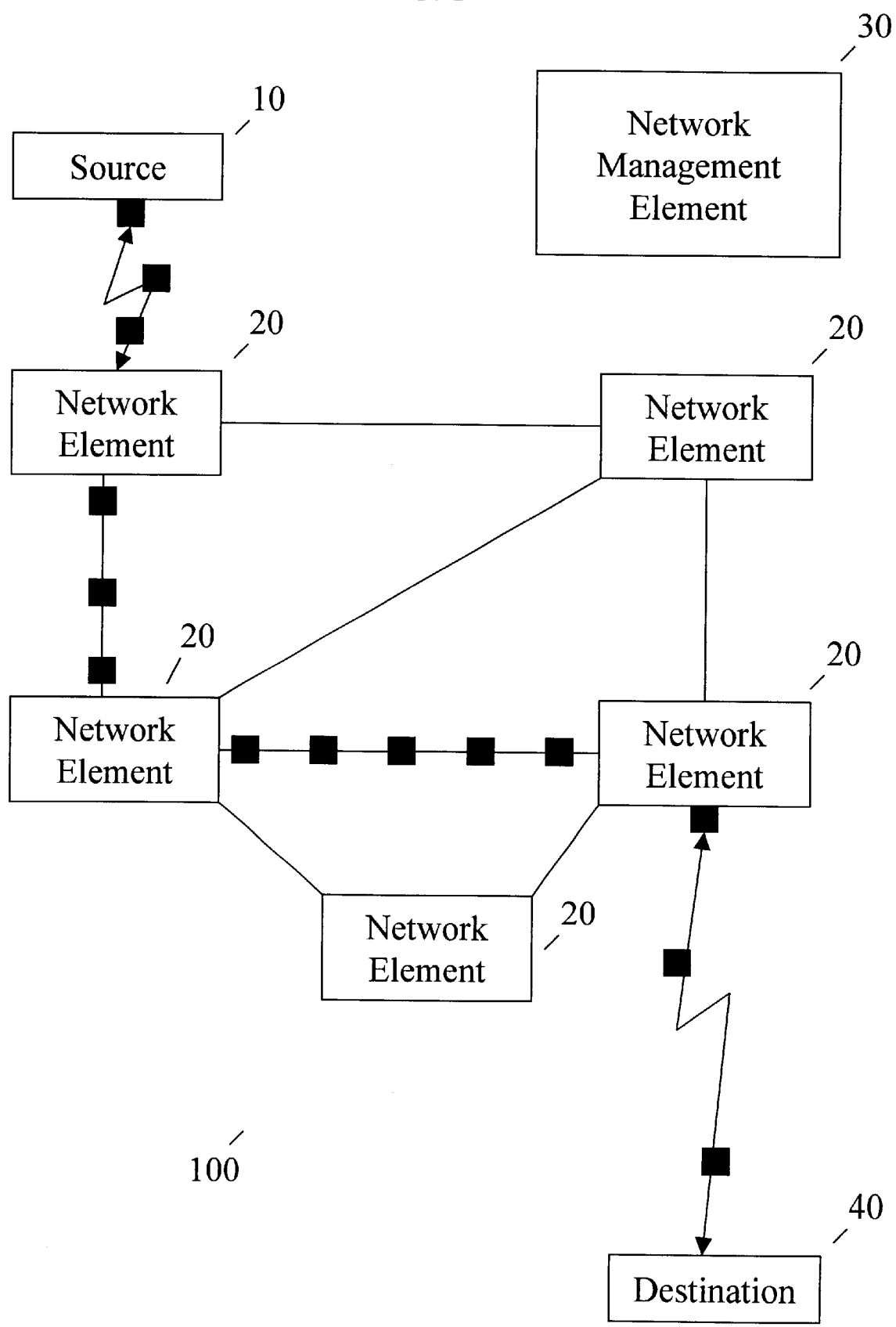
FIG. 1 illustrates a block diagram of the apparatus of the present invention.

FIG. 1 illustrates a block diagram of the apparatus of the present invention which, in the preferred embodiment, is a communication network. The apparatus is designated generally by the reference numeral 100. The apparatus or network 100 includes a subscriber unit 10 and a plurality of network elements or nodes 20. The network elements 20 are linked to adjacent network elements 20 by any one or more of wire links, wireless links, optical communication links, satellite communication links, analog communication links, digital communication links, personal communications services links, etc.

The network elements or nodes 20 may be linked to the components of the apparatus or network 100 (hereinafter referred to as "apparatus 100") via any suitable communication medium. The network elements or nodes (hereinafter referred to as "nodes", or in the case of the singular, "node") 20 may be linked together in any contiguous network topology, including a complete or incomplete mesh, star, ring, line, or other configuration. The nodes 20 are controlled or managed by a network management element 30 which may control or manage any number, or group, of nodes 20. The network 100 also includes a destination unit 40.

In the apparatus 100 of FIG. 1, the source unit 10 communicates with the destination unit 40 via the network of nodes 20. The communication between the source unit 10 and the destination unit 40 is provided through a connection, which is established through the nodes 20. The term "connection" as defined herein, is a path which data follows through the apparatus 100 in going from the source unit 10 to the destination unit 40, without breaks or loops. The data flow between the source unit 10 and the destination unit 40 is bi-directional so as to facilitate communication between the source unit 10 and the destination unit 40 as well as communication between the destination unit 40 and the source unit 10.

The direction of the data flow between the source unit 10 and the destination unit 40 is defined herein as the "forward" direction. The direction of the data flow between the destination unit 40 and the source unit 10 is defined herein as the "backward" direction. Although not a requirement of apparatus operation, typically, the path followed by the data, as it travels through the apparatus 100 in the forward direction, is the same as the path followed by the data as it travels through the network in the backward direction.

In the context of "switched" or "dynamic" connections, which are connections which are created at the request of the source unit 10 from a location external from the apparatus 100, and which exist within the apparatus 100 only for as long as required by the source unit 10 and the destination unit 40, the source unit 10 requests the creation of the connection. In the context of "permanent" connections, which are connections which are created at the request of the network management element 30, and which exist permanently within the apparatus 100, the designation of the source unit 10 and the destination unit 40 of the connection is arbitrarily assigned.

The nodes 20 are also operatively connected to the network management element 30. The network management element 30 provides command and control signals to the nodes 20 so as to control and/or monitor the operation of same when, and if, desired.

Figure 2:
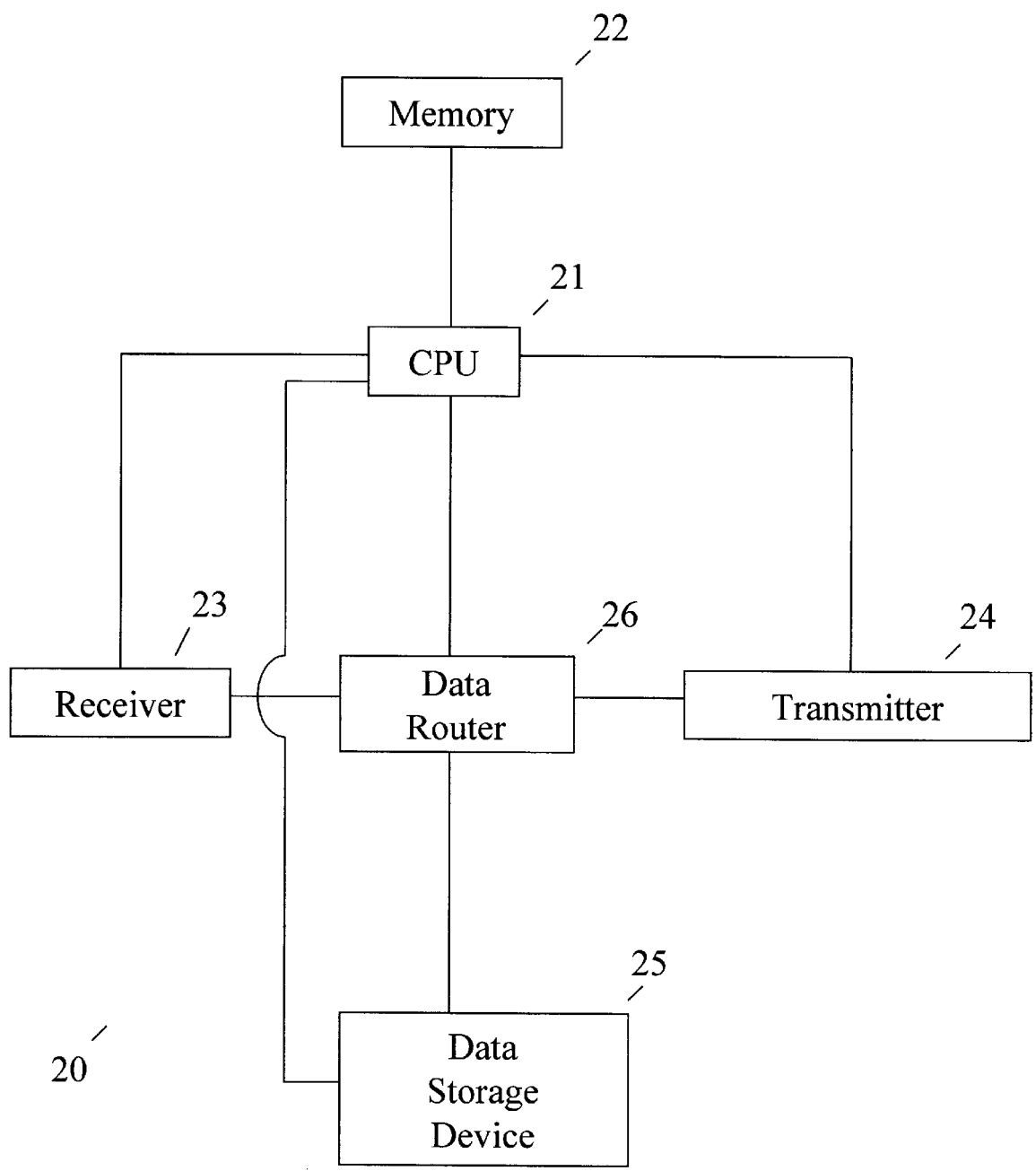
FIG. 2 illustrates a block diagram of a network element or node which is utilized in the apparatus of FIG. 1.

FIG. 2 illustrates a block diagram of a node 20 which is utilized in the apparatus 100 of FIG. 1. In FIG. 2, the node 20 includes a central processing unit (CPU) 21, for controlling operation of the node 20, and an associated memory storage device 22. As described in more detail below, the CPU 21 of the node 20 performs various processing routines during apparatus operation. The node 20 also includes a receiver 23, for receiving signals from other components of the apparatus 100, a transmitter 24, for transmitting signals to other components of the apparatus 100, and a data storage element 25, for storing data received from components of the apparatus 100. The node 20 also includes a data routing device 26 for routing data in the apparatus 100.

Each of the receiver 23, the transmitter 24, the data storage device 25 and the data routing device 26 are operatively connected to the CPU 21. The receiver 23 receives data from a component of the apparatus 100 along one or more links. The data router 26 routes the data to the transmitter 24, or to the CPU 21, or both, according to the intended destination for the data. The transmitter 24 transmits data to another component(s) of the apparatus 100 along one or more links. Data may also be temporarily stored in the data storage device 25 during operation of the node 20.

The term "data", as used herein, refers to both communication data, which is being exchanged between the source unit 10 and the destination unit 40, and to control data which is exchanged between the nodes 20 themselves and between the network management element 30 and the nodes 20. The present invention injects control data into the data which is communicated in the apparatus 100. The CPU 21 of each node 20 generates control data and injects the control data into the data which is being transmitted through the apparatus 100.

Each of the nodes 20 has assigned thereto a unique node identification code. These node identification codes serve to identify the node 20 with such identification information being crucial to apparatus operation. Administration of the node identification codes for the individual nodes 20 is performed by the network management element 30.

Figure 3:
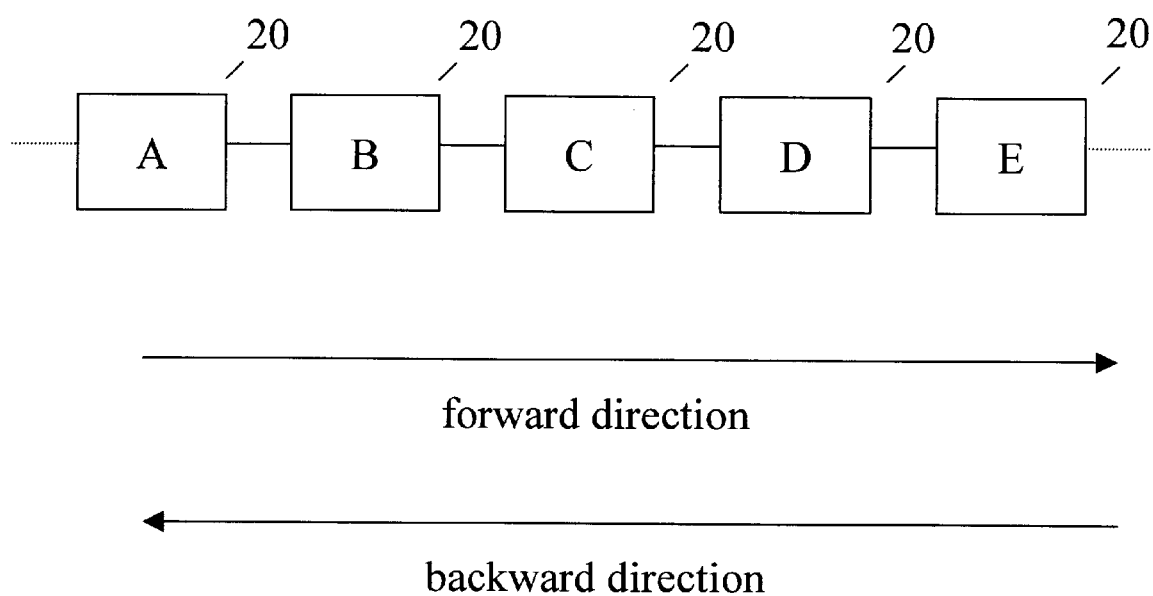
FIG. 3 illustrates a section of the apparatus through which a connection has been established.

The operation and method of use of the apparatus 100 is described in the following manner. FIG. 3 illustrates a section of the apparatus 100 through which a connection has been established. This section is comprised of five nodes 20, identified from left to right as nodes A, B, C, D and E, respectively, as shown. The nodes 20 are depicted in a linear configuration so as to illustrate their relative positions within the apparatus 100.

As noted above, the present invention provides apparatus and methods for identifying the path through a communication network. The present invention may also determine the distances between the nodes 20 of the network. A node, defined as the "trace request node", transmits control data streams to all of the remaining nodes in the apparatus 100, which are defined as "responder nodes". In FIG. 3, node B is selected to be the trace request node.

In the preferred embodiment, the apparatus and methods of the present invention utilize a multi-stage, control data generation and processing routine which is performed for each linked portion of the apparatus 100 relative to the trace request node. In this regard, the trace request node B will separate the apparatus 100 into a portion corresponding to a forward direction of the connection, relative to the trace request node B, and a portion corresponding to a backward direction of the connection, relative to the trace request node B. In this manner, data or signals will be transmitted in both directions from the trace request node B. The two portions of the apparatus 100, on either side of the trace request node B, are processed independently.

In a first stage of operation, the trace request node B transmits a control data stream into each of the portions of the apparatus 100, along the connection to be traced. In the second stage of operation, a second control data stream is added by any of the responder nodes, intermediate or otherwise. The data from both of these control data streams are then utilized by responder nodes to gather connection information and topology information, as well as intermediate data which is related to the distances of each of the responder nodes A, C, D and E from the trace request node B.

In a third stage of processing, the trace request node B transmits a third control data stream, into the two network portions, thereby triggering the return of fourth control data stream responses from the responder nodes to the trace request node B. These returned fourth control data streams represent the fourth stage of operation and contain distance information which is representative of the distance of each of the responder nodes A, C, D and E from the trace request node B. The distance information, as well as the other obtained information, may thereafter be utilized by the trace request node B for analysis and/or display purposes.

The control data streams, which are generated by the respective nodes during apparatus operation, consist of data which is unique to the processing routine. FIG. 4 illustrates the format of the control data streams which are generated and transmitted by the nodes during the various stages of a trace request operation. The control data stream contains a command code, which identifies the type of operation to be carried out by the nodes, the source identification code (source ID), which identifies the trace request node, and a correlation tag, which is unique to the trace request and unique to the portion of the apparatus or network 100 being interrogated. The control data stream also contains a responder identification code (responder ID), which, once inserted by the respective responder node, identifies the responder node, and a distance count, which indicates how far the responder node is from the trace request node. The command code will contain data representative and/or indicative of the processing stage (i.e., trace request, trace repeat, trace report, or trace response).

The control data stream contains a provision for the responder node ID and for the distance codes at all times even though these codes may not be utilized at a given instant. For instance, upon the generation of the control data stream by the trace request node, the responder node ID code and the distance code may be set to zero until each respective responder node inserts its respective codes or data.

The operation of the apparatus 100 is described herein with reference to FIGS. 5 through 10. The CPUs 21 of each of the nodes 20 are capable of performing any and all of the processing operations described herein. In this regard, any one of them may function as a trace request node or as a responder node, at any given instant in time. The nodes 20 may be controlled by the network management element 30 which may initiate operation of any node as a trace request node.

Figure 5:
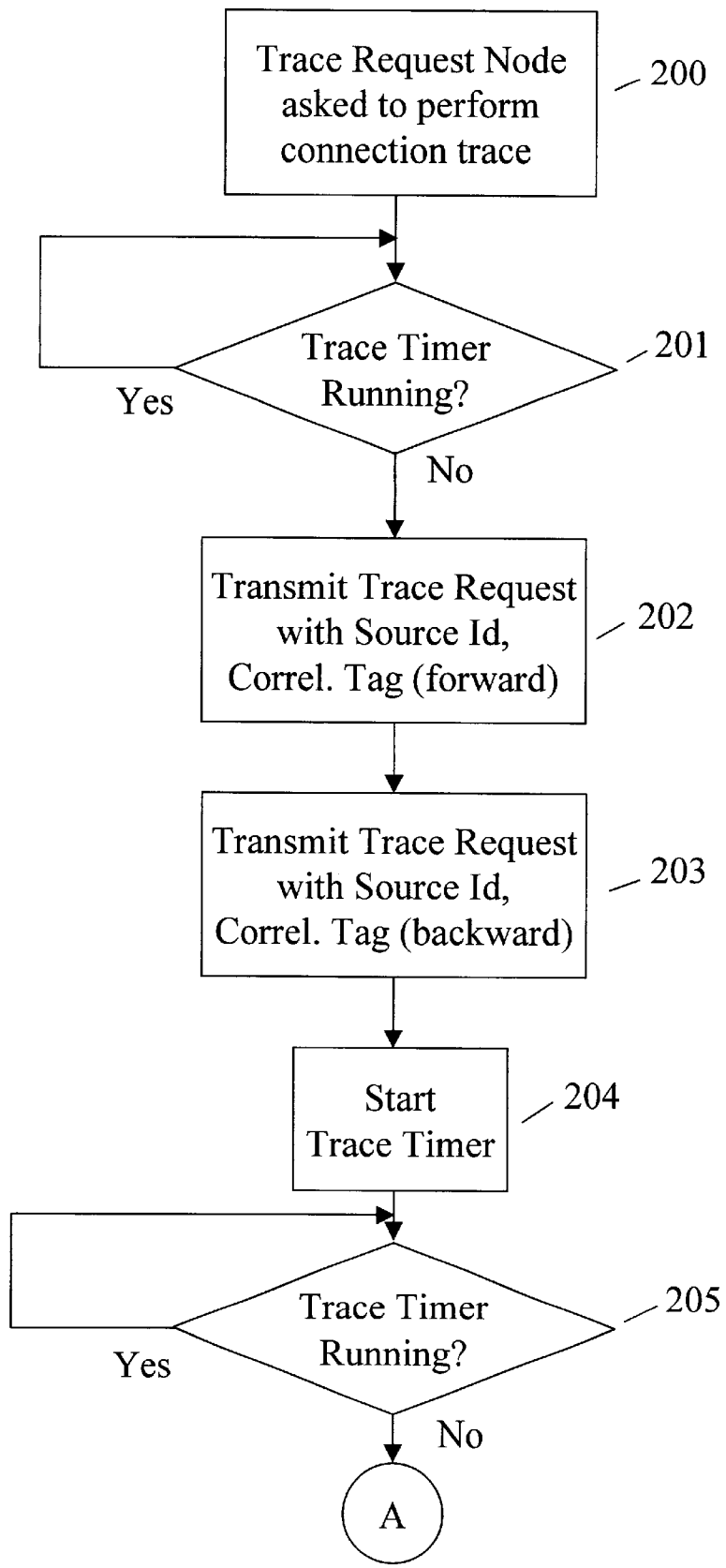
FIG. 5 illustrates, in flow diagram form, an operation of a trace request network element during apparatus operation.
Figure 5:
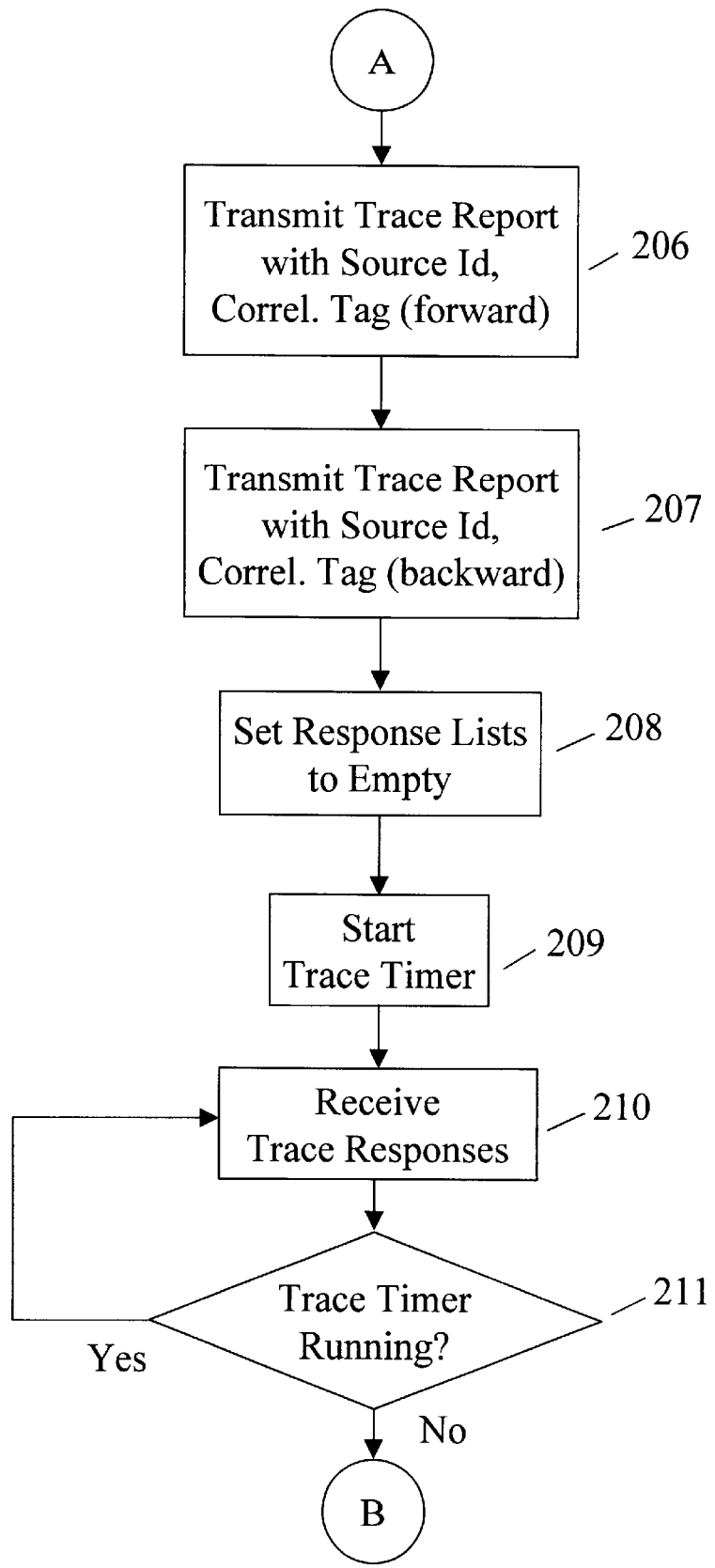
Figure 5:
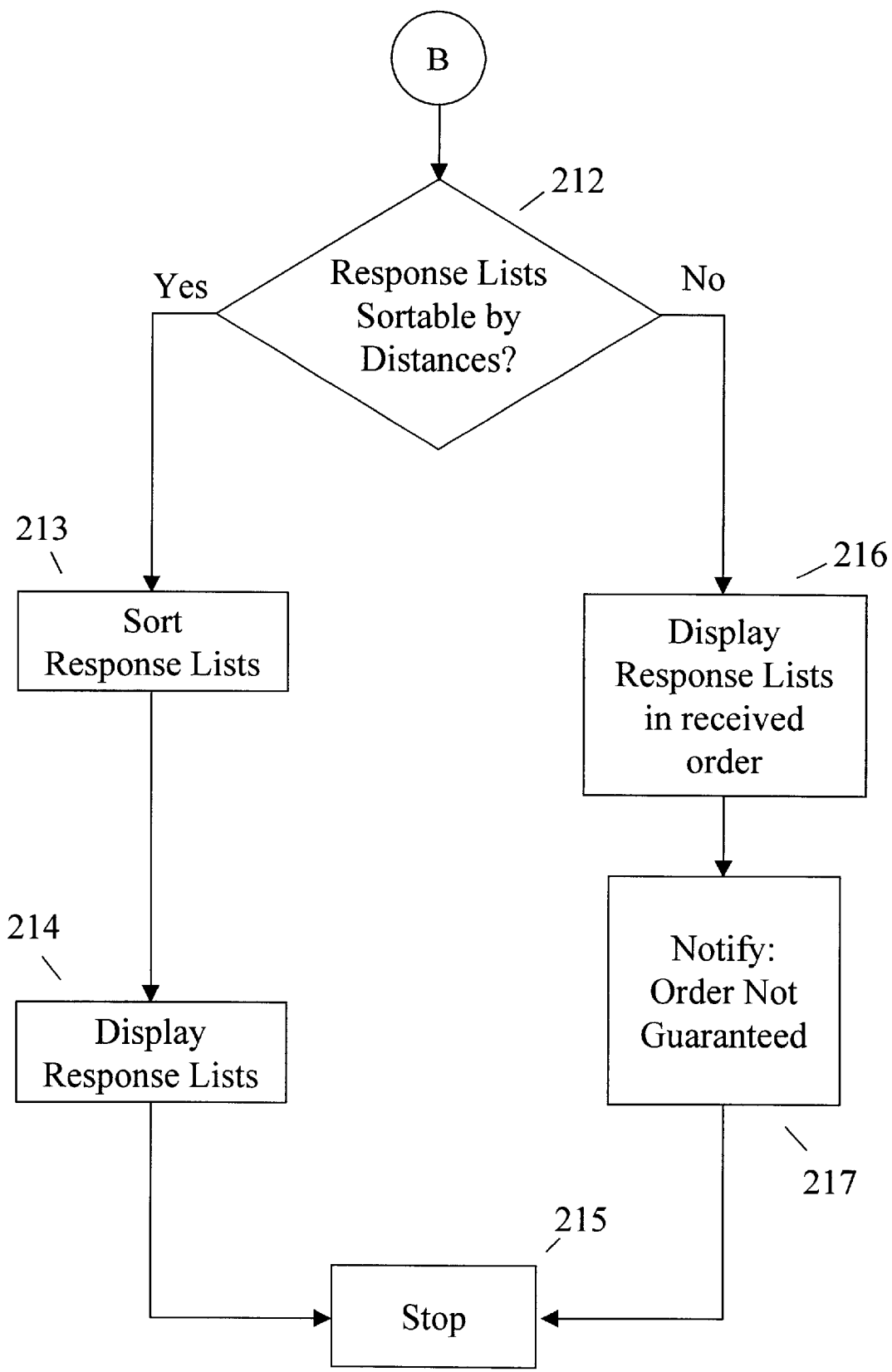

FIG. 5 illustrates, in flow diagram form, the operation of the trace request node B. The operation of the trace request node B commences at step 200 with the receipt by node B of an instruction from the network management element 30 to perform a trace operation on a specific connection which passes through node B. At step 201, a test is performed in order to determine if a previous trace request operation is already in progress. This test is performed by determining whether a predefined trace timer time period, chosen in the preferred embodiment to be five (5) seconds, has expired. If the time in the trace timer has not expired, no new trace request may be initiated and apparatus operation will return to step 200.

If, at step 201, the trace timer time period has expired, the trace request node B will, at step 202, generate a trace request data stream comprising the trace request command code, the source ID of the trace request node, and a unique correlation tag. The trace request data stream will be transmitted through the apparatus 100 from node B, along the specified connection in the forward direction. At step 203, the trace request node B will generate a second trace request data stream comprising the trace request command code, the source ID of the trace request node, and a unique correlation tag, distinct from the tag utilized in step 202.

The trace request data stream generated at step 203 will then be transmitted through the apparatus from node B, along the specified connection, in the backward direction. At step 204, the trace timer is set to a pre-selected time period, which is chosen in the preferred embodiment to be five (5) seconds. At step 205, a test is performed in order to determine if the time in the trace timer has expired. If the time period in the trace timer has not expired, the trace request node B will return to step 205 and continue in this loop, which is effectively a delay loop, until the time in the timer has expired.

If, at step 205, the time in the trace timer has expired, the trace request node B will, at step 206, generate and transmit a trace report data stream containing the trace report command code, the source ID of the trace request node B, and the correlation tag which was utilized at step 202. The trace report data stream will be transmitted through the apparatus 100 from node B, along the specified connection, in the forward direction. At step 207, the trace request node B will generate and transmit a trace report data stream containing the trace report command code, the source ID of the trace request node, and the correlation tag used, at step 203, through the apparatus along the specified connection in the backward direction.

At step 208, the trace request node B will create two response lists which will be utilized for storing trace response information which is returned by the responder nodes A, C, D and E. One response list will be associated with the correlation tag used for the trace request in the forward direction while the other response list will be associated with the correlation tag used for the trace request in the backward direction. Both of the lists will be cleared initially for use in conjunction with the new trace request operation.

At step 209, the trace timer will be set to the pre-selected time period, which is chosen in the preferred embodiment to be five (5) seconds. At step 210, the trace request node B will receive the trace response data streams which are received from the responder nodes A, C, D and E. Each of the responses will be appended to the list associated with the respective correlation tag for the trace response data. At step 211, a test is performed in order to determine if the time in the trace timer has expired. If the time has not expired, operation will return to step 210 and the trace request node B will continue to receive trace response data streams.

Upon the expiration of the time period in the trace timer, the CPU 21 of node B will examine the contents of the trace response lists. At step 212, a test is performed in order to determine if the entries in each response list are sortable by the distance data d, which data represents the distance of the responder nodes A, C, D and E from the trace request node B. In the preferred embodiment, the entries are considered to be sortable if the distances d may be arranged so as to form the sequence of integers 1, 2, 3, . . . , N where N is greater than or equal to 1. If, at step 212, it is determined that each response list is sortable by distance data d, the CPU 21 of node B will sort each list, at step 213, and display the results at step 214. Thereafter, operation of the apparatus 100 will cease, at step 215, and await the next issuance of a trace request operation.

The network management element 30 may control the issuance of the trace request operations and control the trace request nodes which issue same. Any results of apparatus operation may be obtained at the network management element 30.

If, at step 212, it is determined that the data is not sortable by distance data d, the CPU 21 will, at step 216, display the trace response lists in their original arrival order and, at step 217, display a notification that the arrival order list is not guaranteed to be accurate. Thereafter, the operation of the apparatus 100 will cease, at step 215, and await the next issuance of a trace request operation.

Figure 6:
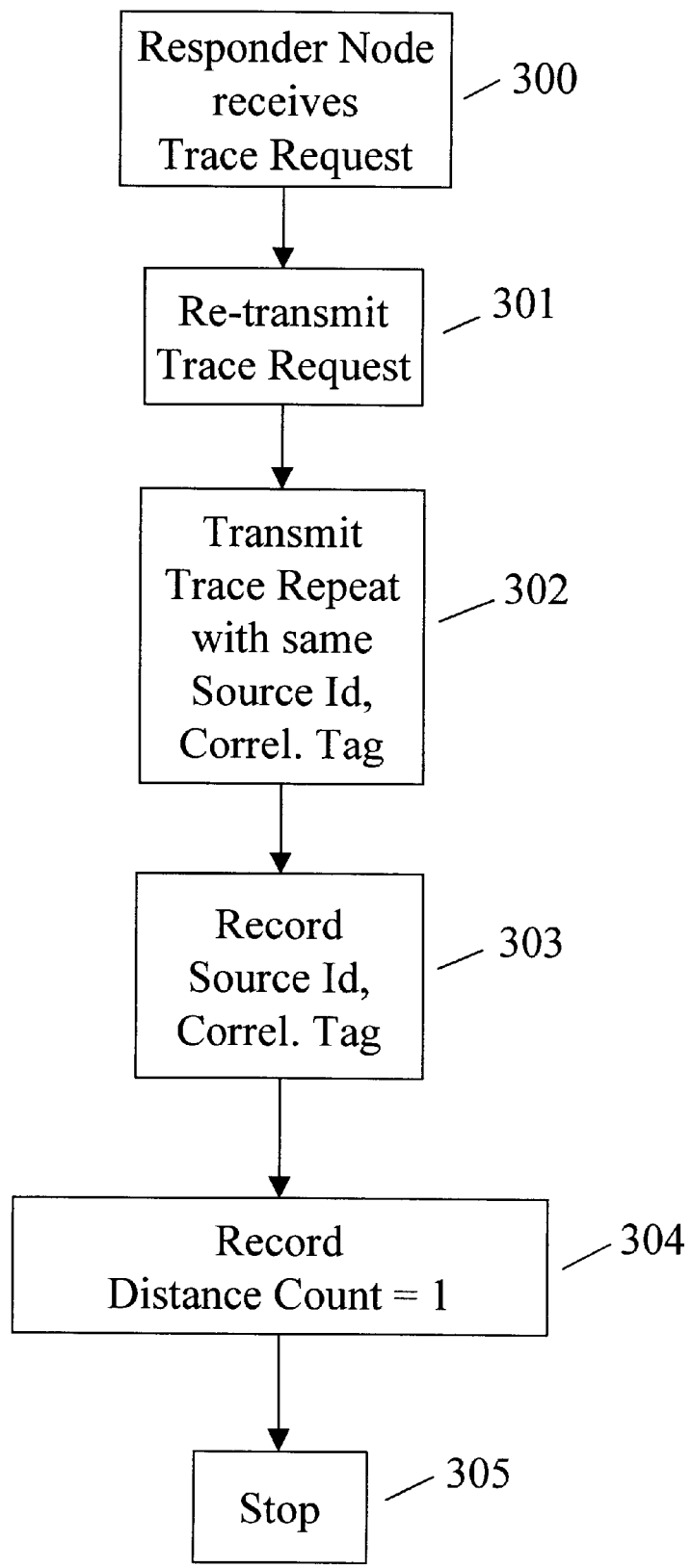
FIG. 6 illustrates a flow chart of an operation of a responder network element, which receives respective trace request data streams.

FIG. 6 illustrates a flow chart of the operation of the responder nodes which receive the respective trace request data streams. The operation of each of the responder nodes commences, at step 300, with the reception of a trace request data stream from the trace request node B in either the forward or the backward direction. At step 301, the responder node will re-transmit the trace request data stream to the remaining portion of the apparatus 100 in the same direction as the direction in which the trace request data stream was received from the trace request node B. The data stream will propagate from one side of the node to the other side of the node.

At step 302, the responder node will generate a trace repeat data stream, which is also transmitted in the same direction of propagation as the trace request data stream for that portion of the apparatus 100. The trace repeat data stream contains the trace repeat command code, as well as the source ID and the correlation tag from the trace request data stream.

Following step 302, the responder node records in its memory 22 the information needed in order to retain the data necessary for determining distance of the responder node from the trace request node B. At step 303, the responder node records the source ID and the correlation tag of the trace request which was just received. At step 304, the responder node initializes an associated distance count to a value of one (1), thereby indicating that the responder node is at least one node away from the trace request node B. Thereafter, operation of the responder node will cease, at step 305, until it receives another trace related data stream, such as, for example, a trace request signal or a trace repeat signal. Each of the responder nodes maintains a count of the number of trace repeat signals in addition to the initial trace request signal, which corresponds to the distance of the respective node from the trace request node.

Figure 7:
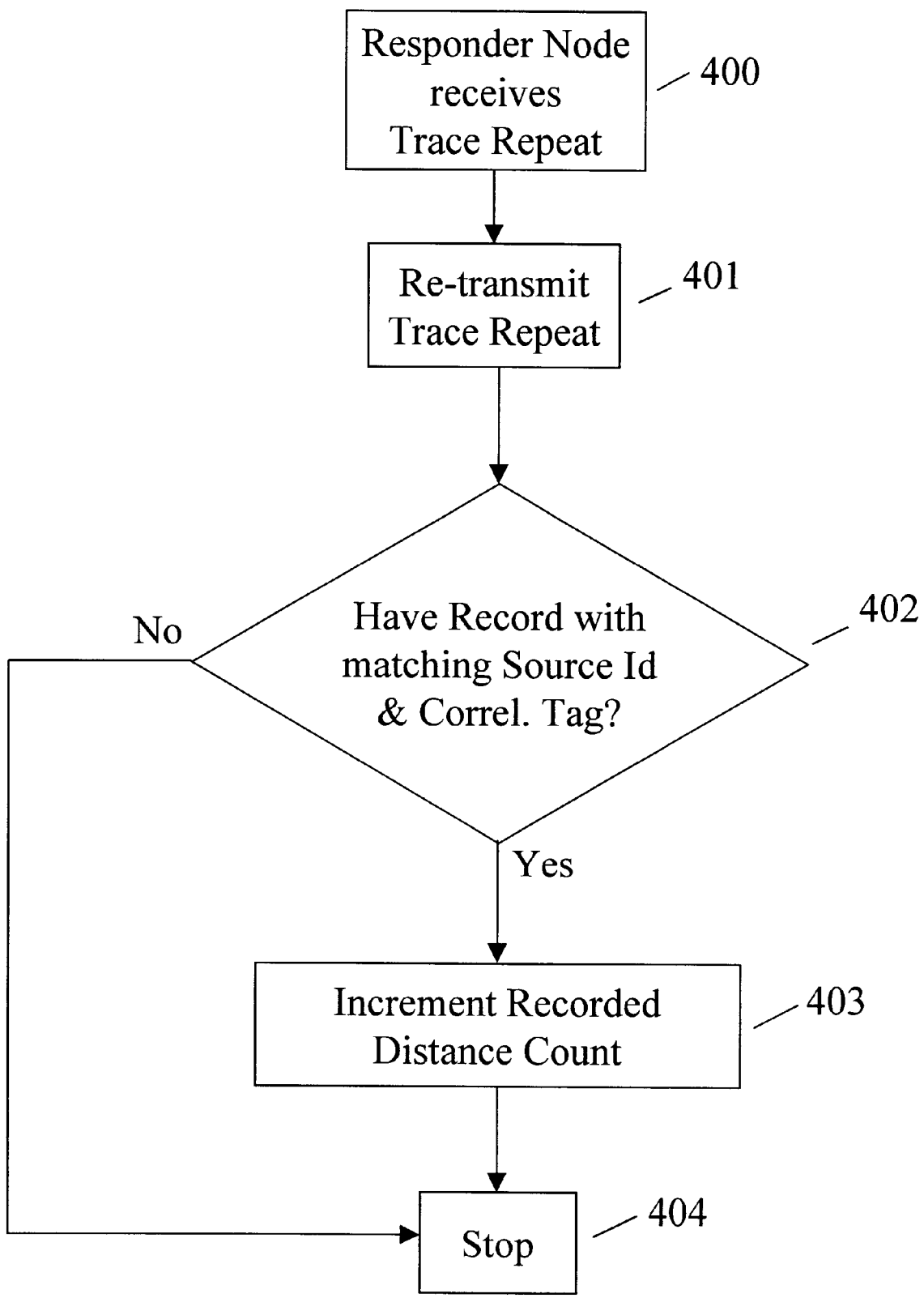
FIG. 7 illustrates a flow chart of the operation of a responder network element which receives a trace repeat data stream.

FIG. 7 illustrates a flow chart of the operation of the responder nodes which receive a trace repeat data stream. Operation commences, at step 400, with the receipt of a trace repeat data stream which originated from another responder node which is located between the receiving responder node and the trace request node B. At step 401, the responder node will re-transmit the trace request data stream in the same direction of propagation as the originally transmitted trace request data stream.

At step 402, a test is performed at the responder node in order to determine if the information stored in the memory 22 has been received as a trace request data stream having the same source ID and correlation tag as that contained in the trace repeat data stream. If, at step 402, a matching record is found, then, at step 403, the recorded distance counter is incremented by one (1), thereby acknowledging the presence of an additional intermediate responder node located between the responder node and the trace request node B. Thereafter, operation of the responder node will cease, at step 404, until another trace data stream is received at the node.

By ascertaining the number of trace repeat data streams which are obtained at a particular responder node, in response to a given trace request, the distance of the responder node, from the trace request node, may be computed. For example, the responder node receiving no trace repeat data stream will be easily understood to be located immediately adjacent to the trace request node, with such an instance corresponding to a distance of one (1). Similarly, a responder node which receives a single trace repeat data stream would be understood to have a single responder node located between itself and the trace request node, with such an instance corresponding to a distance of two (2). In the same manner, a responder node which receives N trace repeat data streams would be understood to have N responder nodes located between itself and the trace request node, with such an instance corresponding to a distance of N+1.

If, at step 402, no matching record is detected, the responder node will be unable to act upon the trace repeat data stream. Thereafter, operation of the responder node will cease, at step 404, until another trace data stream is received. Such a situation may arise if the responder node has failed to receive the trace request data stream from the trace request node B, the trace repeat data stream was delayed while passing through the apparatus and processing of the trace request has already been completed, or if the source ID, or the correlation tag, of either the trace request data stream or the trace repeat data stream had been corrupted while passing through the apparatus.

After the necessary time periods have elapsed, during which time periods the trace request data stream and the trace repeat data streams have been processed, the trace request node B will transmit a trace report data stream, in the manner described hereinabove with reference to the operation of the apparatus as described and illustrated in FIG. 5.

Figure 8:
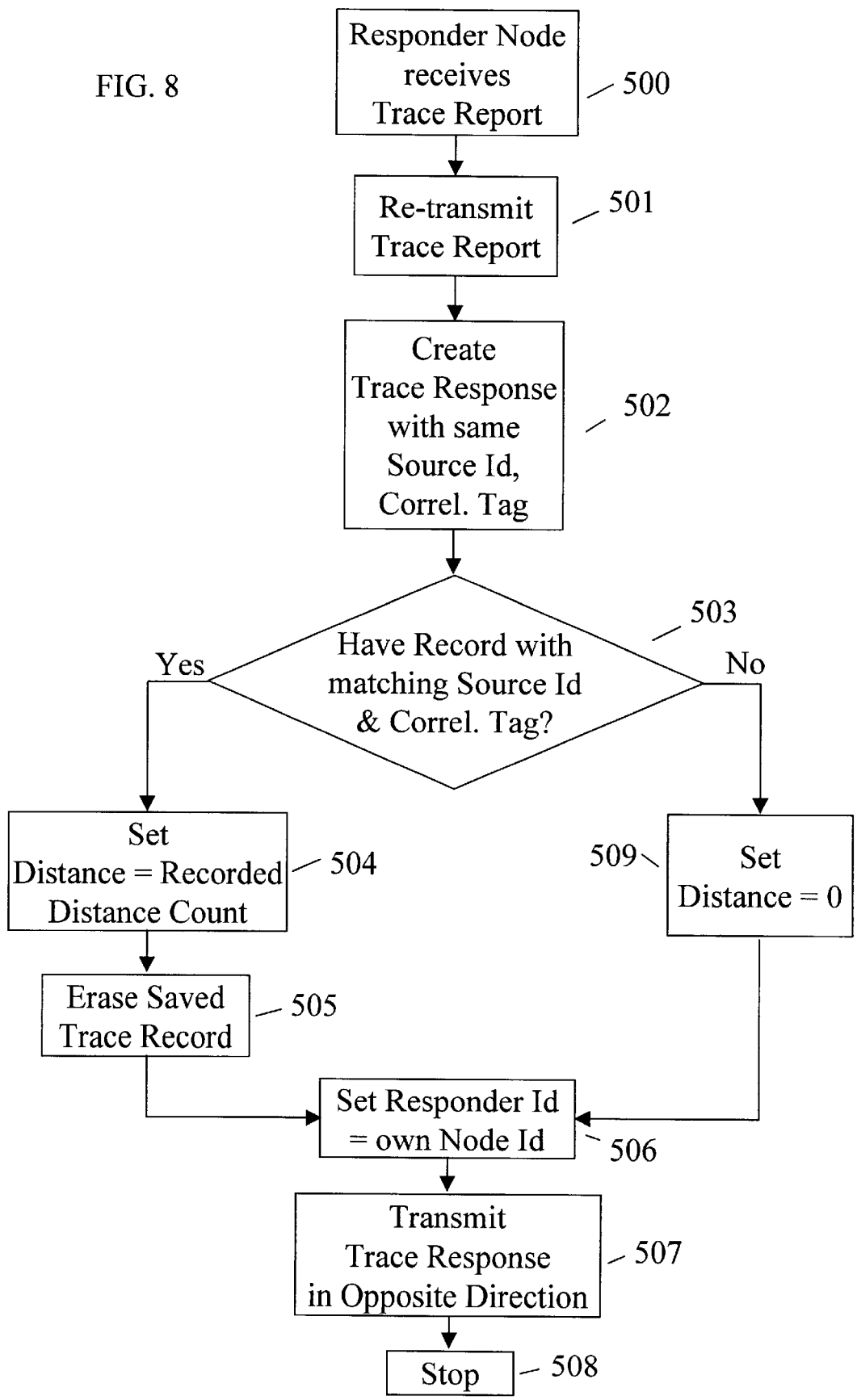
FIG. 8 illustrates a flow chart of the operation of a responder network element which receives a trace report data stream.

FIG. 8 illustrates a flow chart of the operation of the responder nodes which receive a trace report data stream. Operation commences, at step 500, with the receipt of a trace report data stream which originated at the trace request node B. At step 501, the responder node will re-transmit the trace report data stream, in the same direction of propagation as the trace report data stream, to the next responder node.

At step 502, the responder node will create a trace response data stream. The trace response data stream contains, in part, the trace response command code, as well as the source ID and the correlation tag from the trace report data stream.

At step 503, the responder node tests the recorded information against data which is stored in memory 22 in order to determine if it has received a trace request data stream having the same source ID and correlation tag as that contained in the trace report data stream. If, at step 503, a matching record is determined to have been found, then, at step 504, the recorded distance count, which represents the distance of the responder node from the trace request node B, is inserted into the trace response data stream. Thereafter, at step 505, the recorded trace request information is erased from memory 22. In this manner, the source ID, the correlation tag, and the distance count are erased.

Thereafter, at step 506, the responder node generates a trace response data stream which contains its responder node ID. At step 507, the responder node transmits the trace response data stream in the direction towards the trace request node B, which is in the direction opposite the direction from which the trace report data stream was received. Thereafter, operation of the responder node will cease, at step 508, until it receives another trace data stream.

If, at step 503, no matching record is found in the responder node's memory 22, the responder node will be unable to determine its distance from the trace request node B. At step 509, the distance field of the trace response data stream will be set to zero (0). Thereafter, the responder node will proceed to step 506 and the operation of the responder node will continue as described above with reference to steps 506 through 508. Such a situation may arise if the responder node failed to receive the trace request data stream from the trace request node B, or if the source ID, or the correlation tag of either the trace request data stream or the trace report data stream has been corrupted in its passage through the apparatus 100.

Figure 9:
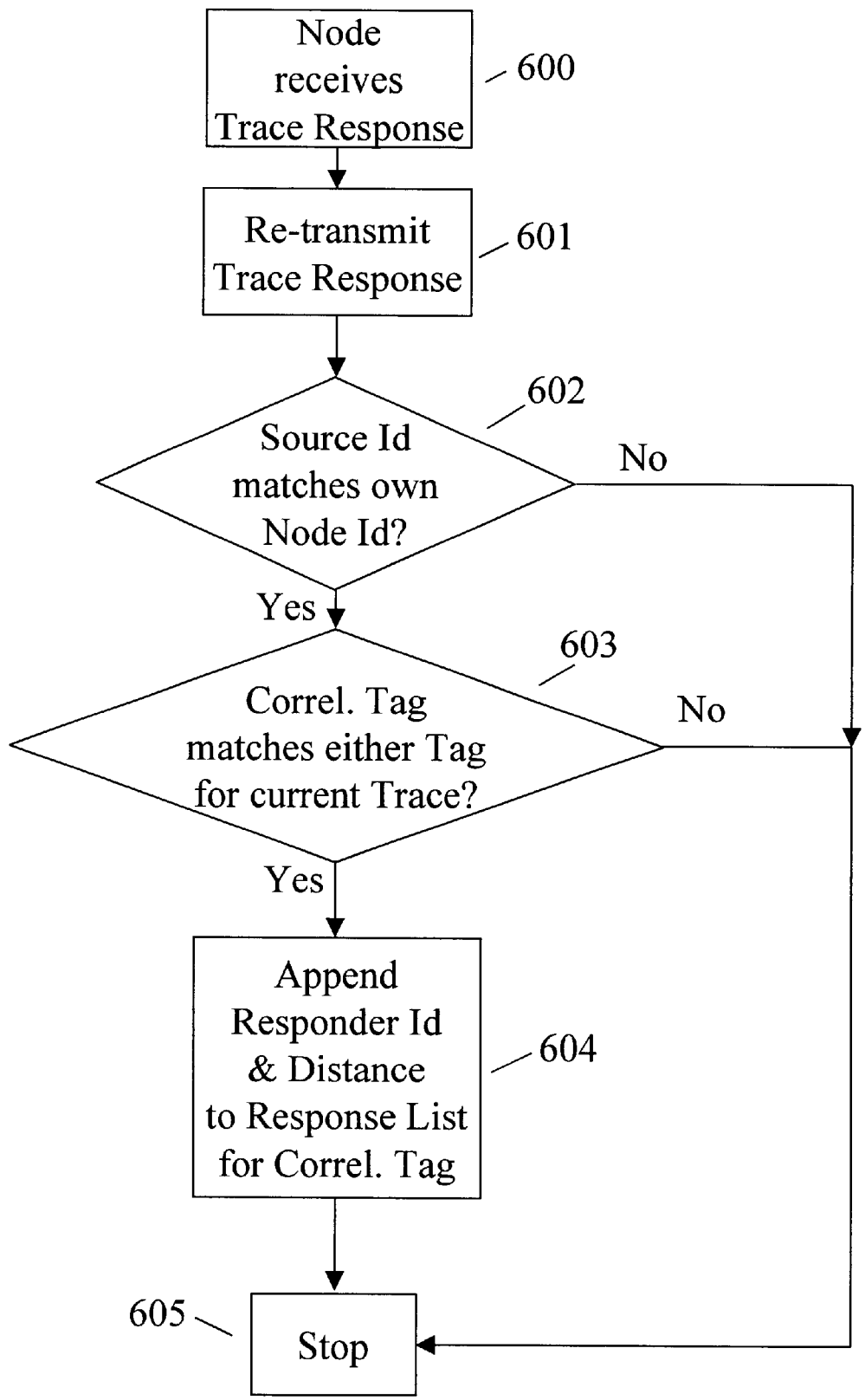
FIG. 9 illustrates a flow chart of the operation of a network element upon receiving trace response data from another responder network element.

FIG. 9 illustrates a flow chart of the operation of a node 20 which is referred to as a "receiving node", upon receiving a trace response data stream from another responder node. The receiving node may be either the trace request node B or another responder node. Operation of the receiving node commences, at step 600, upon the reception by the receiving node of a trace response data stream from a responder node. At step 601, the receiving node will re-transmit the trace response data stream in the same direction of propagation as the trace response data stream which it had previously received. In this manner, the receiving node will re-transmit the trace response data stream in the direction toward the trace request node B.

At step 602, the receiving node performs a test in order to determine if the source ID field of the trace response data stream matches its own node ID. If, at step 602, the source ID field matches its own node ID, a condition indicating that the receiving node is the trace request node B, the node, which is the trace request node B will, at step 603, perform a test in order to determine if the correlation tag field of the trace response data stream matches the correlation tag associated with either of the two response lists. If, at step 603, the correlation tag field of the trace response data stream is determined to match the correlation tag associated with a response list, then, at step 604, the respective response list will be augmented with a new entry which will contain the responder ID field and the distance field of the trace response data stream. Thereafter, operation of the trace request node B will cease, at step 605.

If, at step 602, the source ID field of the trace response data stream is determined not to match the node ID of the receiving node, a condition indicating that the receiving node is a responder node, the operation of the responder node will cease, at step 605, as it is not required to perform further processing of the trace response data stream.

If, at step 603, it is determined that the correlation tag of the trace response data stream does not match the correlation tag which is associated with a response list, a condition indicating that the trace request node B has received a trace response which it cannot process, then operation of the trace request node B will cease, at step 605. Such a situation may arise if the trace response data stream was delayed while passing through the apparatus 100 and that the processing of the trace request data has already been completed, or that the source ID or correlation tag of either the trace request data stream or the trace response data stream was corrupted while passing through the apparatus 100.

Figure 10A:
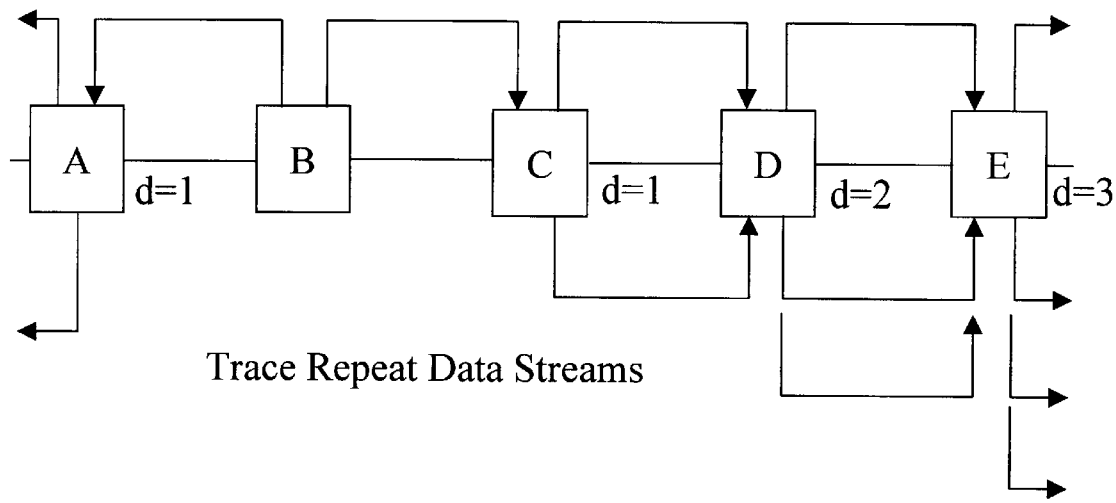
FIGS. 10A and 10B illustrate the overall operation of the apparatus of the present invention.
Figure 10B:
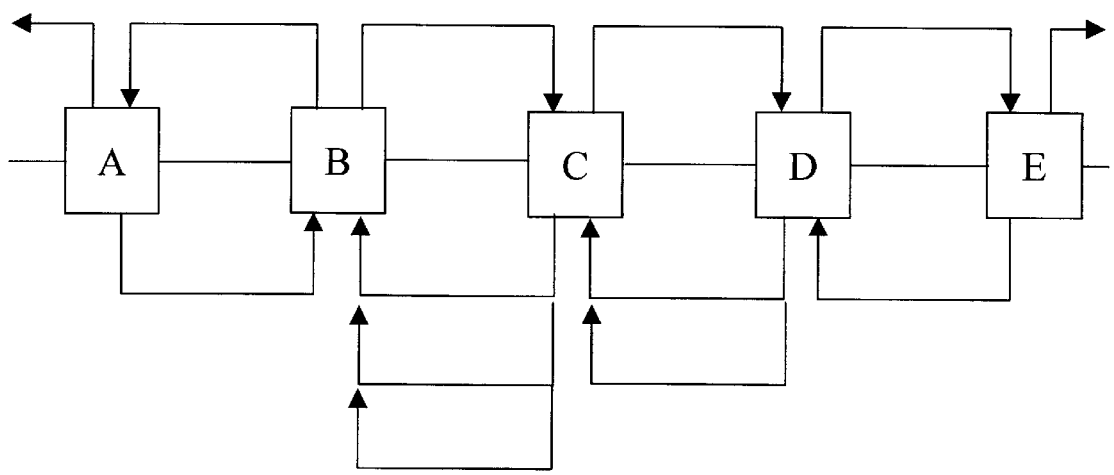

FIGS. 10A and 10B illustrate the operation of the apparatus 100. In FIG. 10A, the trace request data streams are transmitted from the trace request node B to the responder nodes A, C, D and E. FIG. 10A also illustrates the trace repeat data streams which are transmitted from each of the responder nodes A, C, D and E, as shown. FIG. 10A also illustrates the distance count values d, which are computed by each responder node once all of the trace repeat data streams have been processed.

In FIG. 10B, the trace report data streams are transmitted from the trace request node B to the responder nodes A, C, D and E, as shown. FIG. 10B also illustrates the trace response data streams which are transmitted from each of the responder nodes A, C, D and E to the trace request node B. FIG. 10B also illustrates the response lists which are created at and by the trace request node B once all of the trace response data streams have been processed. The contents of the response lists are also sorted by distance.

While the apparatus and methods of the present invention have been described and illustrated as performing traces in two directions, with one direction being to the apparatus or network components in the forward direction, and the other direction being to the apparatus or network components in the backward direction, the present invention may also be utilized, in an alternate embodiment, to perform traces in only a single direction.

In another alternate embodiment of the present invention, the trace request node may perform a second trace request sequence of operations following the conclusion of a first trace sequence. Following the conclusion of the second trace sequence, the trace request node may compare the results which are obtained from the two sequences in order to verify that they are the same. Should the results differ, due to the loss or to the corruption of one or more data streams, during either or both trace sequences, the trace request node may continue to perform additional trace request sequences until matching results are obtained for at least two successive sequences.

In another alternate embodiment of the present invention, the trace repeat data streams may be transmitted by responder nodes in the direction opposite the direction from which the trace request data stream was received. In this regard, trace repeat data streams may be transmitted in the direction of the trace request node. In this embodiment, the operation of the trace request node may be modified so that it records the node IDs of the responder nodes which generated the respective trace repeat data streams. Thereafter, these node IDs may be compared with the set of node IDs for the responder nodes which generated the trace report data streams so as to ensure that they are identical. Such an embodiment facilitates the detection of situations in which the trace report data streams provide the trace request node with incorrect or incomplete results which result from a corruption, or a loss, of trace-related data streams within the apparatus 100.

The operation of the trace request node may also be modified so as to account for instances in which the distance values, which may be computed by the responder nodes, may be reversed.

In yet another alternate embodiment of the present invention, the trace report data stream may be omitted from apparatus operation and processing. In such an embodiment, each responder node records the arrival time of the trace request data stream and automatically returns a trace response data stream upon the expiration of a pre-specified time period, which, for example, may be chosen to be a one (1) second. Alternatively, or additionally, the responder node may further delay the trace response data stream, as the result of the arrival of a trace repeat data stream, which may be associated with an earlier trace request data stream, until a pre-specified time interval of, for example, one (1) second has elapsed without an arrival of such a trace repeat data stream.

In another alternate embodiment of the present invention, trace requests may be performed by different nodes in the apparatus or network. Multiple trace requests may also be performed by the same trace request node. In such embodiments, data streams for a given trace request may overlap with data streams for another trace request. Since each node which initiates a trace request will insert its unique node ID and a unique correlation tag into the trace request data stream, and since the node ID and the correlation tag will also appear in other related trace data streams, the apparatus of the present invention may operate in a mode such that trace request data streams may overlap with one another while maintaining the integrity of obtained data and results.

In yet another embodiment of the present invention, trace requests may be performed along connections which have a single source and multiple destinations. In such embodiments, trace request operations may be performed, along connections which have a "tree" topology rather than a linear topology. In such "point-to-multipoint" connections, any data which is generated by the source unit 10, may be received by all of the destination units 40 in the forward direction, and any data which may be generated by a destination unit 40 may be received by the source unit 10 in the backward direction. However, any data which is generated by a destination unit 40 may not be received by any other destination unit 40. The operations described herein facilitate trace performance by a network node on a portion of the connection passing through same. In such an embodiment, the response list for the forward direction of the connection may be expected to contain multiple entries having the same distance values as more than one node may lie at a given distance from the trace request node.

In still another embodiment of the present invention, the nodes may be comprised of two or more separate node elements. In such an embodiment, each of the separate node elements may generate trace requests and perform network connection and topology processing operations as described herein, as well as perform distance data determination, for each of the links which link the respective node to the apparatus or network. In such an embodiment, the various trace data streams must be augmented so as to include a link identification (link ID) data field (not shown), in addition to the source ID data field, so that link identification may be properly ascertained and considered in the processing routines.

While the present invention has been described and illustrated in various preferred embodiments, such descriptions and illustrations are merely illustrative of the present invention and are not to be construed to be limitations thereof. In this regard, the present invention encompasses any and all modifications, variations, and/or alternate embodiments, with the scope of the present invention limited only by the claims which follow.

What is claimed is:

1. An apparatus for path identification in a communication network, comprising:
    a plurality of network elements, said plurality of network elements further comprising:
        a first network element for transmitting a first control data stream requesting a path identification operation; and
        at least one second network element for receiving said first control data stream request, for retransmitting said first control data stream, and for transmitting a second control data stream, wherein said second control data stream contains information of one of network configuration, network topology, and distance between said first network element and at least one of said at least one second network element.

2. The apparatus of claim 1, further comprising:
    a network management element for providing control over at least one of said plurality of network elements and said apparatus.

3. The apparatus of claim 1, further comprising:
    a source unit; and
    a destination unit.

4. The apparatus of claim 1, wherein at least one of said plurality of network elements further comprises:
    a central processing device;
    a receiver; and
    a transmitter.

5. The apparatus of claim 4, wherein said at least one of said plurality of network elements further comprises:
    a data routing device.

6. The apparatus of claim 4, wherein said at least one of said plurality of network elements further comprises:
    a memory storage device.

7. The apparatus of claim 1, wherein at least one of said plurality of network elements further comprises:
    a plurality of central processing devices;
    a plurality of receivers, wherein each one of said plurality of receivers is associated with one of said plurality of central processing devices; and
    a plurality of transmitters, wherein each one of said plurality of transmitters is associated with one of said plurality of central processing devices.

8. The apparatus of claim 1, wherein at least one of said plurality of network elements performs path identification request operations and path identification response operations.

9. The apparatus of claim 1, wherein said plurality of network elements are configured in at least one of a linear configuration, a ring configuration, a star configuration, a complete mesh configuration, and an incomplete mesh configuration.

10. The apparatus of claim 1, wherein said apparatus is utilized in at least one of an asynchronous transfer mode system and a packet switched system.

11. The apparatus of claim 1, wherein said apparatus is utilized in at least one of a wire communication system, a wireless communication system, an optical communication system, a satellite communication system, an analog communication system, a digital communication system, and a personal communications services system.

12. The apparatus of claim 3, wherein a data flow between said source unit and said destination unit is bi-directional.

13. The apparatus of claim 1, wherein said first network element issues said first control data stream on a plurality of links to a plurality of said at least one second network element.

14. The apparatus of claim 1, wherein said apparatus processes a plurality of said first control data streams simultaneously.

15. The apparatus of claim 1, wherein at least one of said plurality of network elements processes data obtained from said second control data stream to determine one of source identity and trace request identity.

16. An apparatus for path identification in a communication network, comprising:
    means for transmitting a first control data stream requesting a path identification operation; and
    means for receiving and retransmitting said first control data stream and for transmitting a second control data stream, wherein said second control data stream contains information for one of network configuration and distance between network elements.

17. The apparatus of claim 16, further comprising:
    means for providing one of network management operations and control over at least one of said transmitting means and said receiving means.

18. The apparatus of claim 16, which further comprises:
    means for transmitting communication data from a source unit; and
    means for receiving said communication data at a destination unit.

19. The apparatus of claim 16, wherein at least one of said transmitting means and said receiving means comprises:
    means for controlling at least one of said transmitting means and said receiving means;
    means for receiving communication data; and
    means for transmitting communication data.

20. The apparatus of claim 19 wherein said at least one of said transmitting means and said receiving means further comprises:
    means for routing data in a communication network.

21. The apparatus of claim 16, wherein said at least one of said transmitting means and said receiving means further comprises:
    means for storing data.

22. The apparatus of claim 16, wherein a plurality of one of said transmitting means and said receiving means are configured in at least one of a linear configuration, a ring configuration, a star configuration, a complete mesh configuration, and an incomplete mesh configuration.

23. The apparatus of claim 16, wherein said apparatus is utilized in at least one of an asynchronous transfer mode system and a packet switched system.

24. The apparatus of claim 16, wherein said apparatus is utilized in at least one of a wire communication system, a wireless communication system, an optical communication system, a satellite communication system, an analog communication system, a digital communication system and a personal communications services system.

25. The apparatus of claim 16, wherein the data flow between said transmitting means and said receiving means is bi-directional.

26. The apparatus of claim 16, wherein said transmitting means issues said first control data stream on a plurality of links to each of a plurality of said receiving means.

27. The apparatus of claim 16, wherein said apparatus processes a plurality of said first control data streams simultaneously.

28. The apparatus of claim 16, wherein at least one of said transmitting means and said receiving means processes data obtained from said second control data stream to determine one of source identity and trace request identity.

29. A method for determining path identification in a communication network, comprising:
   transmitting a first control data stream from a requesting element to a portion of the network;
   retransmitting said first control data stream, and transmitting a second control data stream from a responding element in response to said first control data stream; and
   processing the information contained in at least one of said first control data stream and said second control data stream to determine one of path identification, network configuration, network topology, and distance of said responding element from said requesting element.

30. The method of claim 29, which further comprises:
   transmitting a third control data stream from said requesting element to the portion of the network;
   transmitting a fourth control data stream from said responding element in response to said third control data stream; and
   processing the information contained in said fourth control data stream to determine one of path identification, one of network configuration and network topology, and distance of said responding element from said requesting element.

31. The method of claim 29, wherein at least one of said requesting element and said responding element is a network element.

32. The method of claim 29, wherein said first control data stream contains at least one of trace request data, requesting element identification data, and correlation data.

33. The method of claim 29, wherein said second control data stream contains at least one of trace repeat data, requesting element identification data, correlation data, and responding element identification data.

34. The method of claim 30, wherein said fourth control data stream contains at least one of trace response data, requesting element identification data, correlation data, responding element identification data, and distance data.

35. The method of claim 30, further comprising:
   storing data obtained from at least one of said first control data stream, said second control data stream, and said control data stream signal.

36. The method of claim 30, further comprising:
   sorting the data obtained from said fourth control data stream by distance.

37. The method of claim 36, further comprising:
   generating a fifth control data stream, wherein said fifth control data stream contains at least one of sorted distance data and unsorted distance data.

38. The method of claim 37, further comprising:
   displaying one of data and information contained in said fifth control data stream.

39. The method of claim 29, further comprising:
   transmitting said first control data stream on a plurality of network links.

40. The method of claim 29, further comprising:
   transmitting said first control data stream to a plurality of responding elements.

41. The method of claim 30, wherein said third control data stream contains at least one of trace report data, requesting element identification data, and correlation data.

42. An apparatus for determining path identification in a communication network, comprising:
   means for transmitting a first control data stream from a requesting element to a portion of the network;
   means for retransmitting said first control data stream and transmitting a second control data stream from a responding element in response to said first control data stream; and
   means for processing the information contained in at least one of said first control data stream and said second control data stream to determine one of path identification, one of network configuration and network topology, and distance of said responding element from said requesting element.

43. The apparatus of claim 42, further comprising:
   means for transmitting a third control data stream from said requesting element to the portion of the network;
   means for transmitting a fourth control data stream from said responding element in response to said third control data stream; and
   means for processing the information contained in said fourth control data stream to determine one of path identification, one of network configuration and network topology, and distance of said responding element from said requesting element.

44. The apparatus of claim 42, wherein at least one of said requesting element and said responding element is a network element.

45. The apparatus of claim 42, wherein said first control data stream contains at least one of trace request data, requesting element identification data, and correlation data.

46. The apparatus of claim 42, wherein said second control data stream contains at least one of trace repeat data, requesting element identification data, correlation data, and responding element identification data.

47. The apparatus of claim 43, wherein said fourth control data stream contains at least one of trace response data, requesting element identification data, correlation data, responding element identification data, and distance data.

48. The apparatus of claim 43, further comprising:
   means for storing data obtained from at least one of said first control data stream, said second control data stream, and said fourth control data stream.

49. The apparatus of claim 43, further comprising:
   means for sorting the data obtained from said fourth control data stream by distance.

50. The apparatus of claim 43, further comprising:
   means for generating a fifth control data stream, wherein said fifth control data stream contains at least one of sorted distance data and unsorted distance data.

51. The apparatus of claim 50, further comprising:

means for displaying one of data and information contained in said fifth control data stream.

52. The apparatus of claim 42, further comprising:

means for transmitting said first control data stream to a plurality of network portions.

53. The apparatus of claim 42, further comprising:

means for transmitting said first control data stream to a plurality of responding elements.

* * * * *